United States Patent [19]

Tanaka

[11] Patent Number: 5,056,858

[45] Date of Patent: Oct. 15, 1991

[54] PARTITION PLATE FOR AUTOMOTIVE VEHICLE

[75] Inventor: Yasuo Tanaka, Kanagawa, Japan

[73] Assignee: Ikeda Bussan Co., Ltd., Ayase, Japan

[21] Appl. No.: 641,296

[22] Filed: Jan. 15, 1991

[30] Foreign Application Priority Data

Mar. 29, 1990 [JP] Japan .............................. 2-31836[U]

[51] Int. Cl.⁵ .......................... B60J 5/00; B62D 43/10
[52] U.S. Cl. .................................... 296/146; 296/37.3; 292/85; 292/91; 292/244; 292/303
[58] Field of Search ................. 296/146, 37.3; 292/91, 292/80, 85, 244, 303

[56] References Cited

U.S. PATENT DOCUMENTS 1,264,814  4/1918  Kornstein .......................... 292/36 X
2,137,035  11/1938  Swallow .......................... 292/303 X

FOREIGN PATENT DOCUMENTS 566874  12/1932  Fed. Rep. of Germany ...... 292/303

Primary Examiner—Margaret A. Focarino
Assistant Examiner—Gary C. Hoge
Attorney, Agent, or Firm—Foley & Lardner

[57] ABSTRACT

A partition plate in use for a vehicle comprises a locking device with which the partition plate is fixable to a luggage floor of the luggage compartment even when the partition plate is fitted on the luggage floor in a manner that either one of either its right and reverse surfaces contacts the luggage floor. The locking device includes a lock spring having a nipping portion with which a projecting pin is nipped so that the partition plate is fixed to the luggage floor.

7 Claims, 5 Drawing Sheets

PARTITION PLATE FOR AUTOMOTIVE VEHICLE

BACKGROUND OF THE INVENTION

1. Field of the Invention

The present invention relates to improvements in a partition plate which is used to divide a luggage compartment of an automotive vehicle into a main compartment and a sub-compartment storing a spare tire and/or the like, and more particularly to a partition plate in which a locking device is provided to secure the partition plate to the luggage compartment even if either surface of the partition plate is faced to the sub-compartment.

2. Description of the Prior Art

It is well known that a partition plate for dividing a luggage compartment is used for an automotive vehicle. Since such a partition plate has a relatively large flat surface and is detachable so as to be removable out of the luggage compartment, it has been proposed that the partition plate is used as a table in the outdoors upon being removed out of the luggage compartment as the partition plate is the type of being reversibly usable.

An example of such a conventional partition plate 6 is shown in FIG. 11 of the present application, in which the partition plate 6 is detachably installed on a luggage floor 5 of a luggage compartment (no numeral). The partition plate 6 includes a locking device 10 with which the partition plate 6 is fixedly secured to a connecting member 9 formed at an end section 5a of the luggage floor 5. As shown in FIG. 11, the locking device 10 includes a housing member 11 installed to a recess of the partition plate 6, a control lever 12 formed at a depression of the housing 11, a locking member 13 connected to the control lever 12 and a spring 14 by which the locking member 13 is pushed to be under a locking condition. When the control lever 12 is rotated in the direction of an arrow A indicated in FIG. 11, the locking member 13 is downwardly inclined and released from the connecting member 9. Therefore, the partition plate 6 becomes under an unlocking condition.

However, with this conventional arrangement, the locking device 10 is formed so that only one side of the partition plate 6 can be fixedly fitted to the luggage floor 5. Furthermore, when the partition plate 6 is installed on the luggage compartment, a clearance is formed between the locking device 10 and the luggage floor end section 5a, thereby degrading an external appearance of the luggage compartment.

SUMMARY OF THE INVENTION

It is an object of the present invention to provide an improved partition plate which is lockably installed to a luggage floor even if either surface of the partition plate is faced to a covered space.

A partition plate of the present invention in use for a vehicle is detachable from a member defining a compartment which member is provided with a projecting pin. The partition plate comprises a board section and a locking device installed to the board section. The locking device includes a housing member having a through-hole through which the projecting pin passes from one surface to the other surface of the housing member when the partition plate is secured to the compartment defining member. A lock spring is disposed in the housing member and lockably engageable with the projecting pin. A supporting plate is disposed in the housing member to support and guide the lock spring in a manner to take one of a first state in which the lock spring lockably engages with the projecting pin and a second state in which a lockable engagement of the lock spring and the projecting pin is released. A sliding member is connected to the lock spring in a manner that the lock spring is deformable to take one of the first and second states upon movement of the sliding member. A pair of control levers are connected to the sliding member to move the sliding member against a bias of the lock spring. The pair of control levers are located opposite each other with respect to a center plane of the board section.

With this arrangement, the partition plate is fittable to the luggage with either surface of the partition plate. Furthermore, the partition plate can be disposed without an excessive clearance between the locking device and the luggage floor. Therefore, the partition plate is largely improved in use and quality.

DETAILED DESCRIPTION OF THE INVENTION

Figure 1:
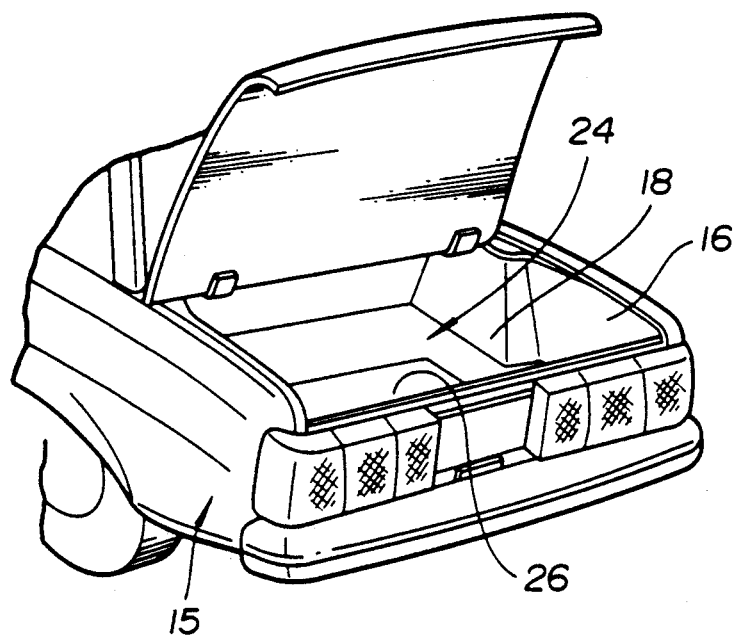
FIG. 1 is a backward perspective view of an automotive vehicle having a partition plate according to the present invention.
Figure 2:
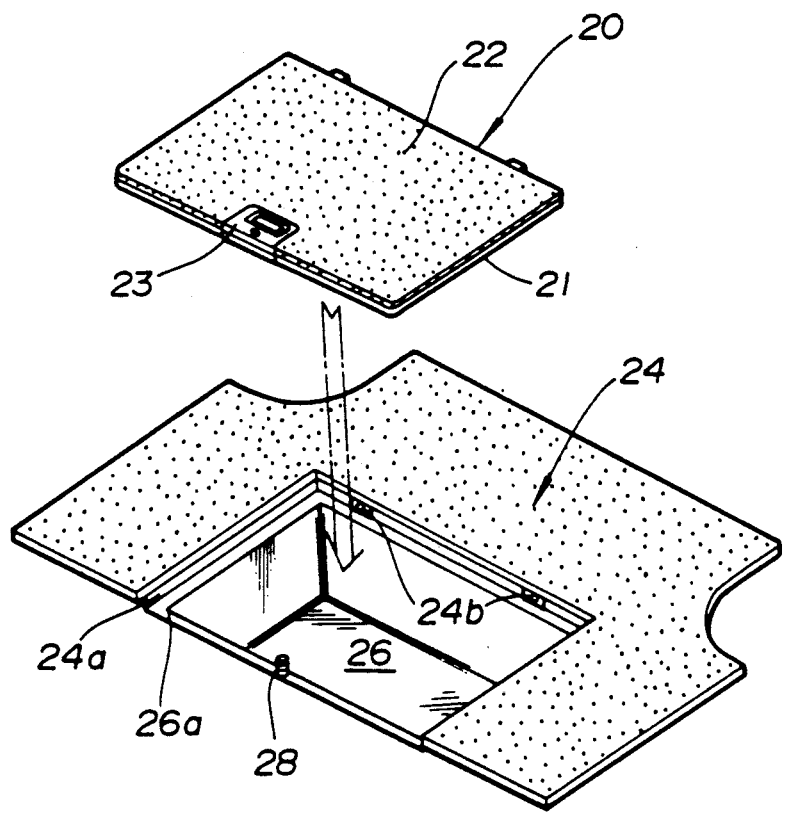
FIG. 2 is a perspective view of an embodiment of a partition plate according to the present invention and a luggage floor.
Figure 3:
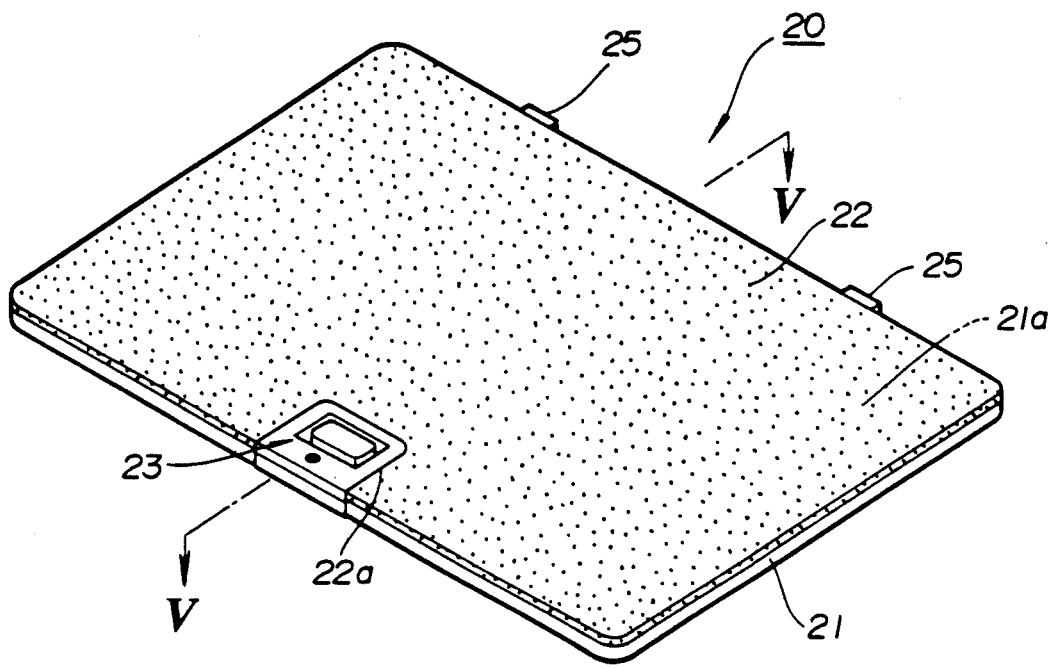
FIG. 3 is a perspective view of the partition plate of FIG. 2.
Figure 4:
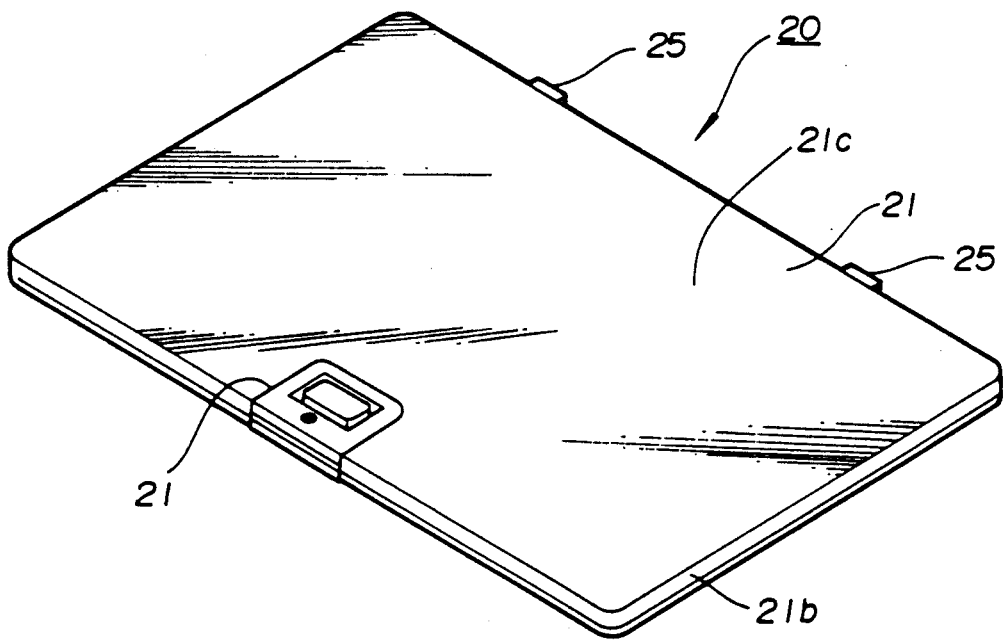
FIG. 4 is another perspective view of the partition plate as viewed from the opposite direction of FIG. 3.

Referring now to FIGS. 1 to 10, an embodiment of the partition plate according to the present invention is illustrated by the reference numeral 20. The partition plate 20 is used for covering a sub-space 26 formed in a luggage compartment 16 of an automotive vehicle 15. The sub-space 26 is located under a main space 18 of the luggage compartment 16 and arranged to store a spare tire and/or the like therein though not shown. The partition plate 20 of a generally rectangular shape comprises a board 21 which has such a size as to be fitted within a section 24a of the luggage floor 24. The board 21 is formed of a molded plastic and has a hollow 21d therein.

The board 21 includes a right surface 21a, a reverse surface 21c and a side peripheral surface 21b. The right and reverse surfaces 21a, 21c are parallel with each other, forming the hollow 21d therebetween. The side peripheral surface 21b is integral with the edges of the right and reverse surfaces 21a, 21c so as to sealingly surround the hollow 21d. The right surface 21a is covered with a carpet 22 serving as a trim member.

The board 21 is formed with a recess 22a at a middle part of its front side end. A locking device 23 is provided in the recess 23a to be generally flush with the surfaces 21a, 21c of the board 21. A pair of connecting members 25 are outwardly projected from the side peripheral surface 21b of an opposite side to the recess 22a of the board 21.

The partition plate 20 is fitted on a step section 26a of the sub-space 26 in a manner such that the connecting members 25 are inserted into holes 24b formed at the section 24a so that the locking device 23 is fixedly connected with a projecting pin 28 formed on the step section 26a. The projecting pin 28 has a slender or neck portion 28a and is disposed at the front middle side end of the section 24a. The projecting pin 28 can be inserted into a through-hole 29a of the locking device 23 even if either surface of the partition plate 20 is faced to the sub-space 26.

Figure 5:
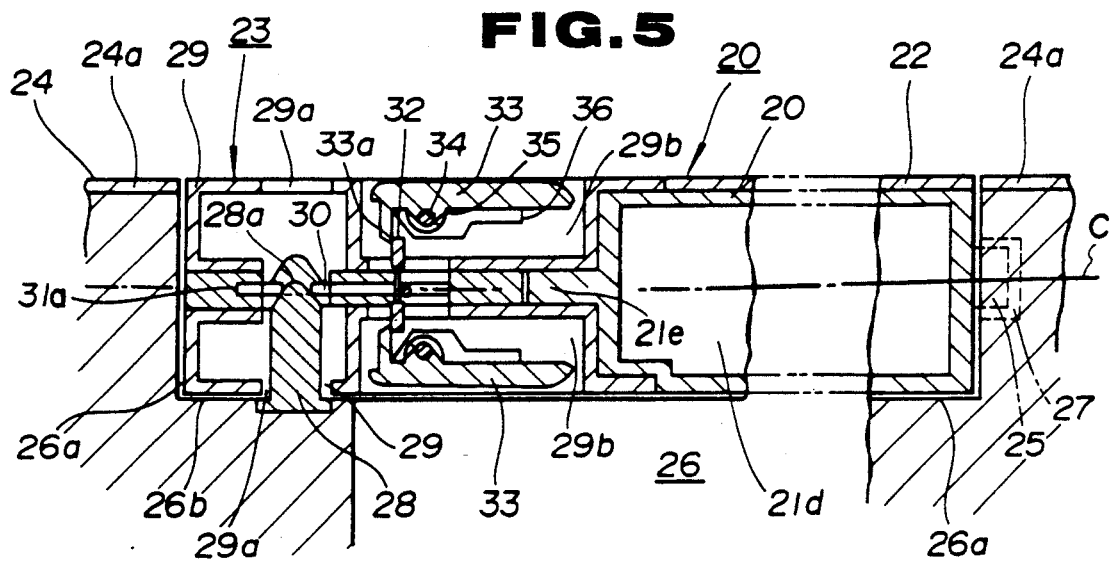
FIG. 5 is a cross-sectional view taken in the direction of arrows substantially along a line V—V of FIG. 3.

The locking device 23 includes a pair of housing members 29. Each housing member 29 is formed of a molded plastic and are disposed at the recess 22a of the board 21. Each of the housing members 29 is secured so as to nip an installation projection 21e of the board 21 and a pair of supporting plates 31. The housing member 29 has the through-holes 29a through which a projecting pin 28 passes to be secured to the locking device 23 even if either surface of the partition plate 20 is faced to the sub-space 26. The housing member 29 has rectangular depressions 29b formed at outer sides of the housing member 29. A pair of control levers 33 are disposed respectively in the depressions 29b to be generally flush with the surfaces of the partition plate 20. The control levers are located opposite to each other with respect to a center plane C of the board as shown in FIG. 5. Each control lever 33 is pivotally supported by a shaft 34 secured to the housing member 29. A spring 35 is installed around the shaft 34 so that the control lever 33 tends to be rotated from its vertical state to its horizontal state. Additionally, a stopper 36 is attached on one inside surface of the control lever 33 so that a position of the control lever 33 is kept at a horizontal state. The control lever 33 has a projection part 33a which is formed in the vicinity of the shaft 34 and extends inward of the board 21 under the horizontal state.

Figure 6:
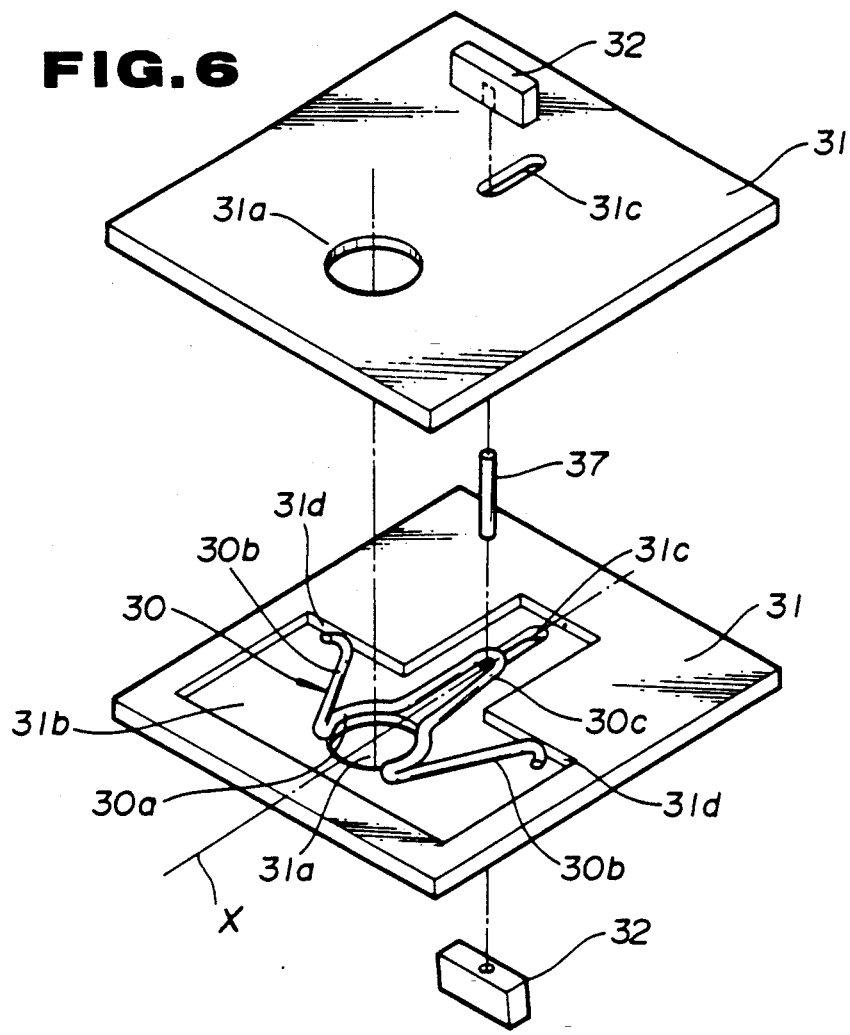
FIG. 6 is an exploded perspective view of an essential part of a locking device of the partition plate.

A lock spring 30 is disposed between the supporting plates 31 as shown in FIG. 6. The lock spring 30 is made of a spring wire and has a pair of nipping portions 30a with which the projecting pin 28 is resiliently engaged at its slender portion 28a as the slender portion 28a is nipped by the nipping portions 30a. Each nipping portion 30a is integral with a supporting leg portion 30b which outwardly extends along the horizontal surface of the supporting plate 31 as shown in FIG. 6. A hairpin like connecting portion 30c of the lock spring 30 is integral with the nipping portion 30a and extends to a slot 31c formed along a center line X which imaginarily divides the supporting plate 31 into two equal parts.

The supporting plate 31 has a through-hole 31a which is formed coaxial with the through-hole 29a when the supporting plate 31 is installed on the partition plate 20. The through-hole 31a is positioned on the line X so that an axis of the hole 31a crosses the line X. The supporting plate 31 has a T-shaped guide groove 31b in which the lock spring 30 is disposed. The supporting plates 31 are disposed so that the guide grooves 31b of the supporting plates 31 face each other. The lock spring 30 is guided by the guide groove 31b to deform to establish a locked condition to an unlocked condition of the partition plate 20. A slot 31c is formed along the line X and positioned at a central part of the supporting plate 31.

A connecting shaft 37 is disposed to pass through the slot 31c and is engaged with the curved part of the connecting portion 30c of the lock spring 30. A pair of sliding members 32 are slidingly disposed on the supporting plates 31 and fixed with the connecting shaft 37. The sliding members 32 are fixedly secured to the opposite ends of the connecting shaft 37. Accordingly, when the sliding member 32 is pushed by the projecting section 33a of the control lever 33 in accordance with the rotational movement of the control lever 33, the lock spring 30 is deformed so that the supporting leg portions 30b are outwardly opened upon sliding along a wall portion 31d defining the guide groove 31b.

Figure 7:
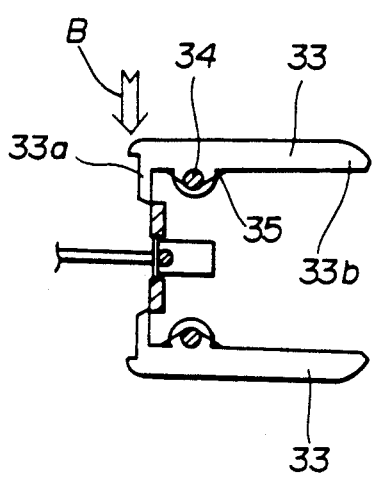
FIG. 7 is a partially cross-sectional view of the locking device under a locking condition.
Figure 8:
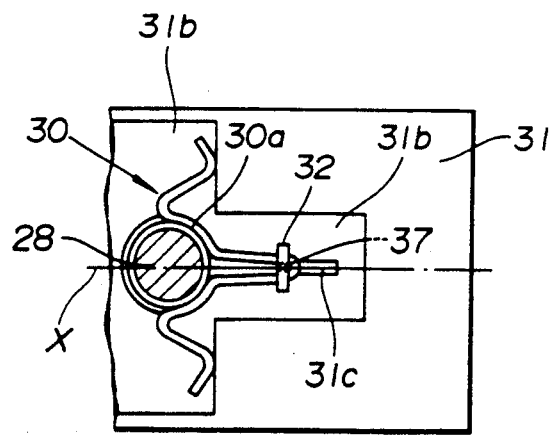
FIG. 8 is a partially sectional plan view of the locking device under the locking condition.
Figure 9:
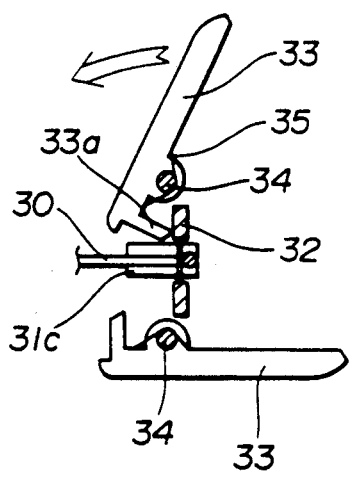
FIG. 9 is a partially cross-sectional view of the locking device under an unlocking condition.

The manner of operation of the thus arranged locking device 23 of the partition plate 20 will be discussed hereinafter referring to FIG. 7 and 10.

In order to attach the partition plate 20 to the step section 26a of the sub-space 26, an attaching operation is carried out as follows: The connecting members 25 are inserted into the connecting holes 27, respectively. The partition plate 20 is put on the step section 26a so that the through-hole 29a of the housing member 29 is located on the projecting pin 28. The nipping portion 30a of the lock spring 30 is resiliently enlarged in its inner diameter by the projecting pin 28 after a top portion of the projecting pin 28 passes through the nipping portion 30a. The top portion 30a of the projecting pin 28 is such formed as to easily pass the nipping portion. Then, the slender portion 28a is secured by the nipping portion 30a in a manner that the nipping portion 30a is decreased in diameter. Thus, the partition plate 20 is secured to the step section 26a so as to be fitted to the step section 26a. Furthermore, the opposite surfaces of the partition plate 20 may be fitted on the step section 26a.

In order to detach the partition plate 20 from the step section 26a, a detaching operation is carried out as follows: First, the control lever 33 positioned at the upper side is pushed to be lifted at its first end 33b as indicated by an arrow B in FIG. 5. Then, the control lever 33 is turned counter clockwise as shown in FIG. 7 When the control lever 33 is turned counter clockwise as shown in FIG. 7, the sliding member 32 is pushed by the projecting portion 33a so as to move along the slot 31c. Simultaneously, the connecting portion 30c moves along the slot 31c through the connecting shaft 37 in accordance with the movement of the sliding member 32. As a result, the nipping portion 30a is deformed to be enlarged at its inner diameter, thereby releasing the connecting pin 28. With this operation, the connecting pin 28 becomes free from the lock spring 30 as shown in FIG. 10. Next, the partition plate 20 is lifted so that a clearance is formed between the partition plate 20 and the step section 26a. The partition plate 20 is detached by being pulled out. The control lever 33 receives a biasing force of the spring 35 so as to be returned into a flat state relative to the board 21.

Figure 10:
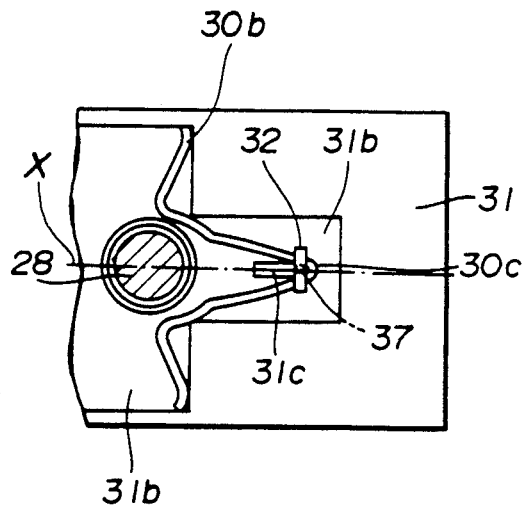
FIG. 10 is a partially sectional plan view of the locking device under the unlocking condition.
Figure 11:
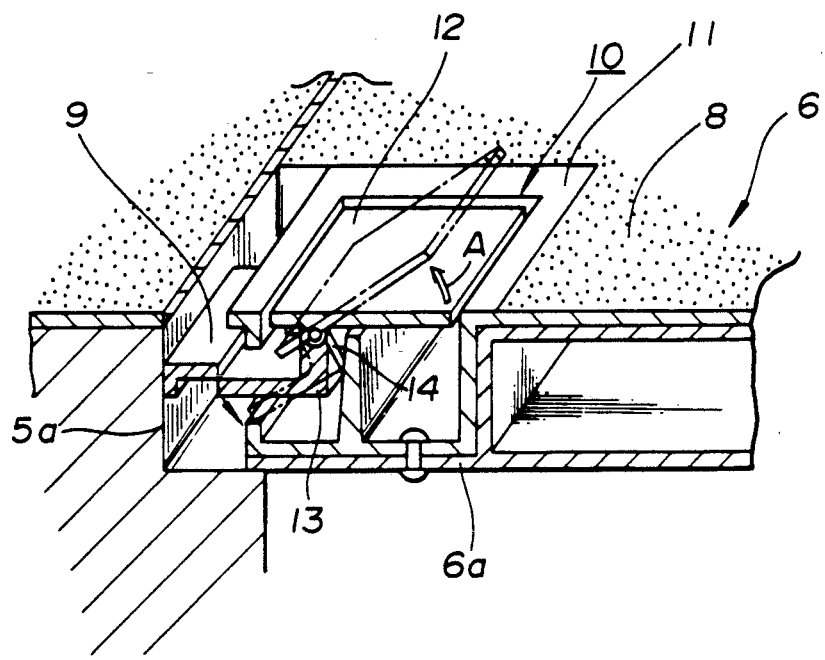
FIG. 11 is a fragmentary perspective view of a conventional partition plate installed to a luggage floor.

Under the condition of FIG. 10, the lock spring 30 pushes the supporting plate 31 to return in the rocking condition since the leg portions 30b are contacted to and pushes the wall portion 31d defining the guide groove 31b. Accordingly the control lever 33 is returned into the locking condition upon releasing of the control lever 33. Furthermore, the lock spring 30 is returned into a shape of the locking condition by virtue of the biasing force of the leg portion 30b of the lock spring 30.

With the thus arranged locking device 23 of the partition plate 20, the partition plate 20 is secured to the step section 26a even if either surface of the partition plate 20 is fitted on the step section 26a. Furthermore, since the locking device 23 is designed to reduce the number of component parts as small as possible, the partition plate 20 can be produced inexpensively.

While only one embodiment has been shown and described, it will be understood that the present invention is not limited to this embodiment and that various modifications and improvements can be applied to this invention. It will be appreciated that thus arranged partition plate may be used as a tonneau board with which a passenger room and a luggage compartment are divided, and as a cover board closing an opening of a member defining an engine compartment.

What is claimed is:

1. A partition plate in use for a vehicle, said partition plate being detachable from a member defining a compartment which member is provided with a projecting pin, said partition plate comprising:
   a board section; and
   a locking device installed to said board section, said locking device including:
      a housing member having a through-hole through which the projecting pin passes from one surface to another surface of said housing member when the partition plate is secured to the compartment defining member;
      a lock spring disposed in said housing member and lockably engageable with the projecting pin;
      a supporting plate disposed in said housing member to support and guide said lock spring in a manner to take one of a first state in which said lock spring lockably engages with the projecting pin and a second state in which a lockable engagement of said lock spring and the projecting pin is released;
      a sliding member connected to said lock spring in a manner that said lock spring is deformable to take one of said first and second states upon movement of said sliding member; and
      a pair of control levers operatively associated with said sliding member to move said sliding member against a bias of said lock spring, said pair of control levers being located opposite to each other with respect to a center plane of said board section.

2. A partition plate as claimed in claim 1, wherein said supporting plate has a guide groove in which said lock spring is disposed.

3. A partition plate as claimed in claim 1, wherein said lock spring is operatively associated with sliding member through a connecting shaft which passes through a slot formed in said supporting plate.

4. A partition plate as claimed in claim 1, wherein said control lever is secured to said housing member with a shaft.

5. A partition plate as claimed in claim 1, wherein said lock spring is formed of a spring wire and includes a nipping portion springingly engageable with the projecting pin, a supporting leg portion integral with said nipping portion and supported by said supporting plate in a manner to provide a bias to said nipping portion in a direction that said nipping portion is engageable with the projecting pin, and a connecting portion integral with said nipping portion and operatively associated with said sliding member.

6. A partition plate in used for a vehicle, said partition plate being detachable from a member defining a compartment which member is provided with a projecting pin, said partition plate comprising:
   a board section having first and second surfaces which are opposite to each other, and a side peripheral surface through which said first and second surfaces are connected, said board section having a recess at a middle part of its front side end; and
   a locking device provided in said recess of said board section, said locking device including a housing member having a through-hole through which the projecting pin passes from one surface to another surface of said housing member when the partition plate is secured to the compartment defining member, a lock spring disposed in said housing member and lockably engageable with the projecting pin, a supporting plate disposed in said housing member to support and guide said lock spring in a manner to take one of a first state in which said lock spring lockably engages with the projecting pin and a second state in which a lockable engagement of said lock spring and the projecting pin is released, a sliding member operatively associated with said lock spring in a manner that said lock spring is deformable to take one of said first and second states upon movement of said sliding member and a pair of control levers operatively associated with said sliding member to move said sliding member against a bias of said lock spring, said pair of control levers being located opposite to each other with respect to center plane of said board section.

7. A partition arrangement used for a vehicle, said partition arrangement including a board section being detachable from a member defining a compartment, said partition arrangement comprising:
   a projecting pin fixed to the compartment defining member, said projecting pin having a slender portion which is slender as compared with a tip end portion thereof;
   said board section being detachable from the compartment defining member, said board section having first and second surfaces which are opposite to each other with respect to a center plane;
   means for allowing either one of the first and second surfaces of said board section to contact with the compartment defining member; and
   a locking device installed to said board section and having first and second surfaces which are generally flush with the first and second surfaces of said board section, said locking device including:
      a housing member having a through-hole through which the projecting pin is passable in one of a first direction of the first surface to the second surface of said locking device and a second direction of the second surface to the first surface of said locking device;
      a lock spring disposed in said housing member and lockably engageable with the slender portion of the projecting pin;
      a supporting plate disposed in said housing member to support and guide said lock spring in a manner that the said lock spring takes one of a first state in which said lock spring lockably engages with the projecting pin slender portion and a second state in which a lockable engagement of said lock spring with the projecting pin slender portion is released;

a sliding member operatively associated with said lock spring in a manner that said lock spring is deformable to take one of said first and second states upon movement of said sliding member; and a pair of control levers connected to said sliding member to move said sliding member against a bias of said lock spring, said pair of control levers being located opposite to each other with respect to the center plane.

* * * * *